Jan. 7, 1930.   E. A. AYLWIN ET AL   1,742,889
DRIVING GEAR FOR MULTIPLE DRIVEN AXLES OF MOTOR ROAD VEHICLES
Filed Jan. 12, 1928   2 Sheets-Sheet 1
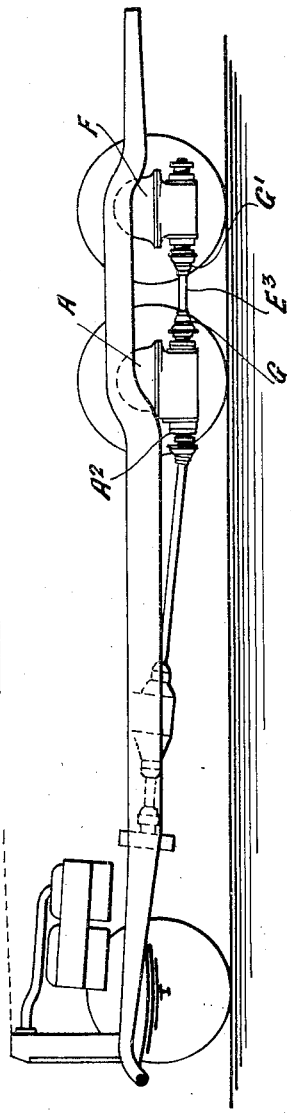
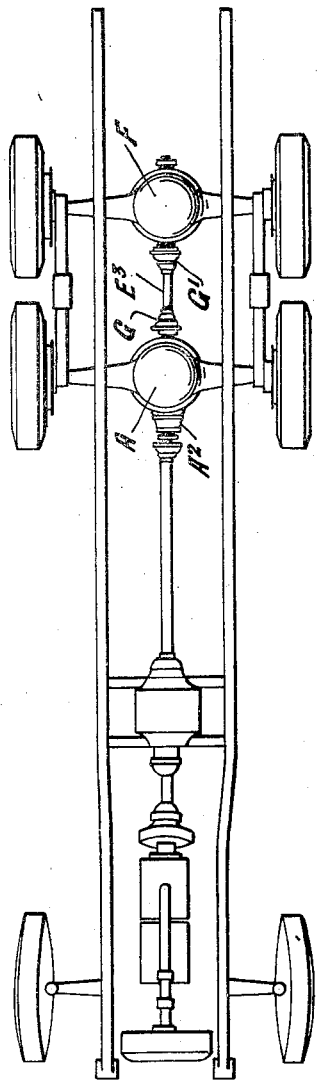

Jan. 7, 1930.  E. A. AYLWIN ET AL  1,742,889
DRIVING GEAR FOR MULTIPLE DRIVEN AXLES OF MOTOR ROAD VEHICLES
Filed Jan. 12, 1928  2 Sheets-Sheet 2
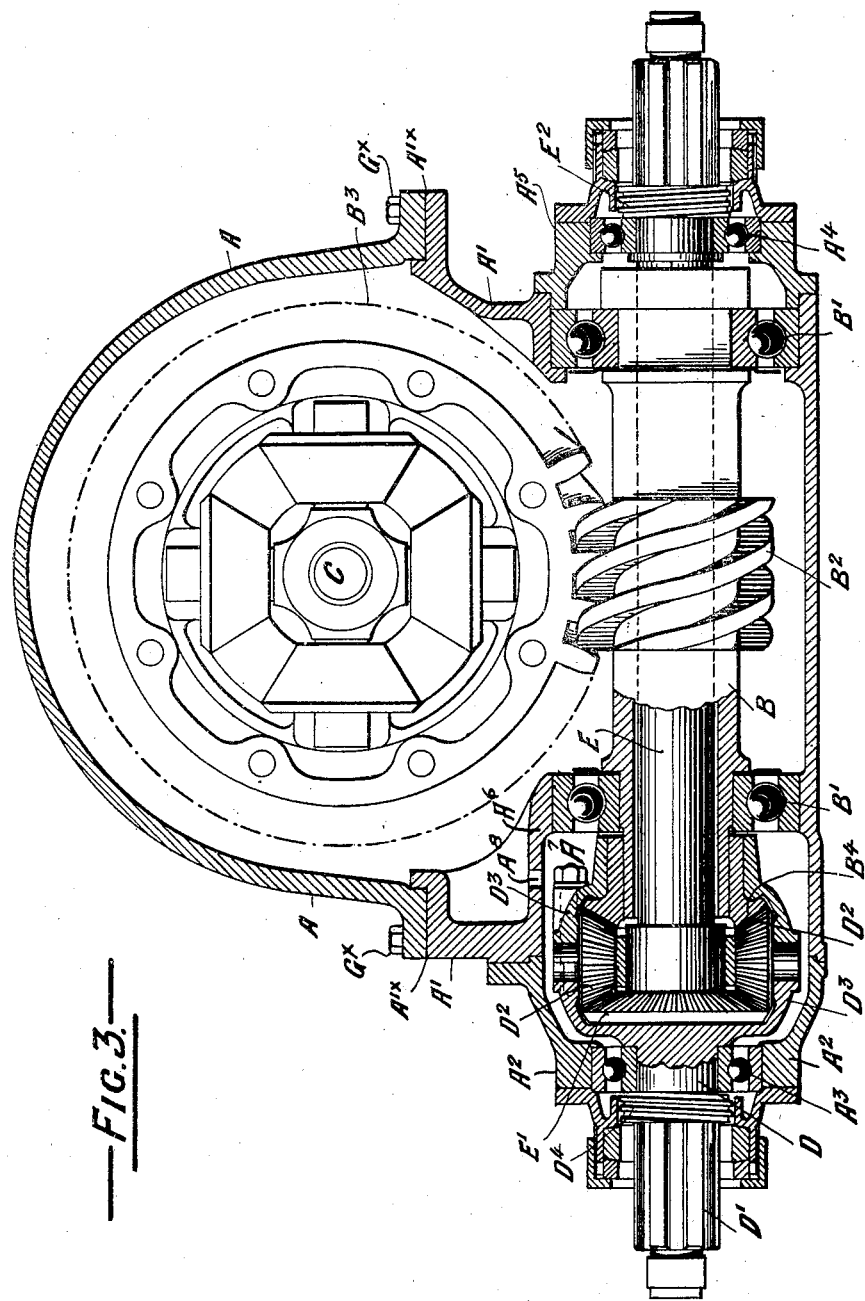

Patented Jan. 7, 1930

1,742,889

UNITED STATES PATENT OFFICE

ERNEST ANGUS AYLWIN AND FREDERICK RAYMOND COWELL, OF KIRKSTALL, NEAR LEEDS, ENGLAND, ASSIGNORS TO KIRKSTALL FORGE LIMITED, OF KIRKSTALL, NEAR LEEDS, ENGLAND

DRIVING GEAR FOR MULTIPLE-DRIVEN AXLES OF MOTOR ROAD VEHICLES

Application filed January 12, 1928, Serial No. 246,170, and in Great Britain February 16, 1927.

This invention relates to driving mechanism to be introduced between the engine or gear box and two axles to be driven of a motor road vehicle, the said mechanism being of such a character that the power is transmitted differentially to the differential gears of each axle, dividing the power equally between the said two axles and thus avoiding the over stressing of one axle due to it taking more than its proportion of the total torque and at the same time permitting small differences in size of wheels to be accommodated without the destructive grinding of the wheel tyres on the road.

It has already been proposed to introduce a differential gear between the foremost and rearmost driving axles by means of a tubular shaft, comprising a tube containing a shaft within it, the tube being driven by one side of the differential gear and the shaft within the tube being driven by the other side of the differential gear. The tube in such a construction carries a worm which drives the differential gear of the foremost axle through a worm wheel on the said differential gear of such foremost axle, while the shaft within the tube and which extends rearward, carries a worm on its rearmost end which drives a worm wheel on the differential gear of the rearmost axle.

In the several instances of construction which have previously been proposed for the differential driving of the differential gears on the foremost and rearmost axles, the differential gear which divides the power between the tubular shaft and the shaft in the tube, has been located outside the differential gear casing of the foremost axle, and such differential gear is therefore inadequately supported and is not open to lubrication from the oil contained in the casing of the differential gear of the foremost driving axle.

The present invention provides a construction in which the differential gear which divides the power between the tube and the shaft, is contained in an extension of the differential gear casing of the foremost axle, and is thus rigidly supported therewith, and moreover by being in open communication with the interior of such casing, maintains all the parts in free lubrication, being immersed in the oil contained in the lower part of the said casing.

In the accompanying drawings an example of construction of the present invention is shown, in which a differential gear for dividing the power equally between the differential gears of the two axles, is housed in a forward lower extension of the casing of the differential gear of the foremost axle, and not only is the said power dividing differential gear thus firmly supported, but it is contained in the oil bath of the casing of the foremost differential gear where it is thus efficiently lubricated.

Figure 1 is a side elevation of a chassis to which the invention is applied. Figure 2 is a plan view of the same chassis, and Figure 3 is an enlarged sectional view of the construction of the foremost differential gear with the power dividing differential gear of the tubular shaft contained in the same casing.

A is the casing of the differential gear of the foremost driving axle. $A^1$ is a removable lower section of the said casing A forming an oil bath for the foremost axle differential gear and having a wall $A^6$ across the forward end thereof, which wall $A^6$ forms a housing $A^7$ and has an aperture $A^8$ to connect the oil bath with said housing $A^7$. $A^2$ is a forward extension of the casing which, together with the wall $A^6$ of the lower section $A^1$, carries the bearings which support the tubular shaft including the differential gear of the tubular shaft and closes said housing. The outer tube B is supported on ball bearings $B^1$, $B^1$, which are carried in the removable lower section $A^1$ of the casing A. The said outer tube B carries a worm $B^2$ which gears with a worm wheel $B^3$ carried by the differential gear of the foremost axle C. The forward extension $A^2$ carries a bearing $A^3$ which supports the forward end D of the differential gear, which is adapted to be connected to the power shaft $D^1$. E is the inner shaft which is supported on bearings $A^4$ carried in a rearward extension $A^5$ of the casing. The shaft E carries a bevel gear wheel $E^1$ gearing with planet wheels $D^2$, $D^2$, in the differential cages $D^3$, $D^3$, of the forward end D. The outer tube B carries a bevel wheel B⁴ which also gears with the planet wheels D², D², in such a manner that when the forward end D is rotated by the shaft D¹, the planet wheels D², D², carry the bevel wheels E¹ and B⁴ round together while the resistances are balanced. The oil which is contained in the lower section A¹ of the casing is prevented from escaping at the exits of the shafts D and E by means of right and left thread packings E² and D⁴. E³ is a communication shaft connected by universal joints G, G¹, with the inner shaft E, and with the shaft carrying a worm for driving the differential gear in the rearmost axle differential casing F.

The lower section A¹ is connected at A¹ˣ to the main casing A by means of bolts Gˣ, Gˣ.

If the road wheels carrying both axles are of similar size, the two bevel spur wheels E¹ and B⁴ rotate at the same speed, being driven equally by the planet wheels D², D², which revolve about the axis of the tube B and shaft E but do not rotate except to accommodate small differences in speed imposed on the tube B and shaft E, by reason of differences in size of wheels, or, differences in road resistance causing minute differences in wheel speeds.

What we claim as our invention and desire to secure by Letters Patent is:—

1. In association with a motor vehicle having two driving axles both operated from the engine through a Cardan shaft, each driving axle including a differential, the combination with the differential of the forward axle of a casing comprising an upper part, housing said axle differential, a lower part removably positioned below and under said axle differential and a forward extension positioned on said lower part, a third differential mounted in said forward extension of the lower part of the casing, a shaft extending from one side of the third differential rearwardly to connect with the differential of the rear axle, a tube surrounding the shaft extending rearwardly from the other side of the third differential below and under the front axle differential said tube having a worm thread adapted to engage and operate the front axle differential, all within said lower part of said casing as specified.

2. In association with a motor vehicle having two driving axles both operated from the engine through a Cardan shaft, each driving axle including a differential, the combination with the differential of the front axle of a casing comprising an upper part housing said axle differential, a lower part constituting an oil bath for said axle differential, an apertured wall in the forward end of said lower part forming at said forward end a housing for a third differential in communication with said oil bath, a forward extension closing said third differential housing, a third differential driving shaft extending through said forward extension, a front axle differential driving member, a rear axle differential driving member extending from said third differential rearwardly through said casing and means on said third differential driving member and rear axle differential driving member to prevent the escape of lubricant from said casing and third differential housing.

3. In association with a motor vehicle having two driving axles both operated from the engine through a Cardan shaft, each driving axle including a differential, the combination with the differential of the forward axle of a casing comprising an upper part housing said axle differential, a lower part constituting an oil bath for and positioned below and under said axle differential, an apertured front lower part in open communication with the oil bath of said casing, a forward extension positioned on said lower part and forming a closure therefor, a third differential mounted in said lower part and moving in the oil bath of the said casing, a rear axle differential driving shaft extending from one side of the third differential rearwardly to connect with the differential of the rear axle, a tube surrounding said shaft extending rearwardly from the other side of the third differential below and under the front axle differential having a worm thread adapted to engage and rotate the front axle differential, a third differential driving shaft for driving said third differential from the Cardan shaft, and means on said third differential driving shaft and rear axle differential driving shaft to prevent the escape of lubricant from said casing and third differential housing.

In witness whereof we have hereunto set our hands.

ERNEST ANGUS AYLWIN.
FREDERICK RAYMOND COWELL.